Patented Mar. 10, 1925.

1,528,794

UNITED STATES PATENT OFFICE.

ISIDOR B. ROSS, OF NEW YORK, N. Y.

INSECTICIDE.

No Drawing. Application filed July 26, 1922. Serial No. 577,751.

*To all whom it may concern:*

Be it known that I, ISIDOR B. ROSS, a citizen of the United States, residing at New York city, New York, have invented certain new and useful Improvements in Insecticides, of which the following is a clear, full, and exact description.

My invention relates to an insecticide, and my object is primarly to provide one either in the form of a liquid or a powder, which is especially adapted for killing the boll-weevil on cotton plants.

Heretofore this boll-weevil has been practically impossible to control satisfactorily by any of the insecticides on the market without at the same time injuring the plants or producing such other deleterious results as renders the use thereof substantially prohibitive. By my invention I have provided an insecticide which actual tests and carefully conducted trials show will stick to the plant so that it is not readily washed off, will quickly kill the weevil, is cheap and has no deleterious effect upon the plant itself or the fibre of the cotton boll.

The main active principles of my insecticide are the bitter principle of bitter aloes and calcium arsenate. When bitter aloes are boiled there is extracted a vegetable body generally known as a "bitter principle," which although known is not thoroughly understood in its organic composition. This bitter principle, as I now understand it, is aloin ($C_{17}H_{18}O_7$ or $C_{17}H_{16}O_7$) which forms fine needles and possesses a very bitter taste.

This when incorporated in solution with calcium arsenate apparently sets up a chemical reaction between the two which produces a substance whose chemical structure is not known with certainty. At any rate, it produces a substance which is sticky and poisonous especially to the boll-weevil, as tests have demonstrated.

I also preferably add permanganate of potash and magnesium sulphate, but these are not necessary in all cases.

In carrying out my invention as I now prefer to prepare the substance I (1) boil ½ lb. bitter aloes for 10 minutes in a half gallon of water and then cool. This extracts the bitter principle in solution. (2) Then make a solution of one grain permanganate of potash in one pint of water, (3) calcium arsenate which is less than 1% water-soluble and whose total arsenate content should be over 38%, (4) 1 oz. by weight of magnesium sulphate dissolved in one pint of water.

To one gallon of water add ½ liquid ounce of the aloe solution and ½ liquid ounce of the magnesium sulphate solution, one teaspoonful of the permanganate of potash solution and one ounce of the calcium arsenate. These should be thoroughly mixed and allowed to stand. The liquid can be used as a spray or may be dehydrated to a powder and used dry.

Tests under Government supervision have shown that the foregoing insecticide is extremely efficacious in combating the boll-weevil and may be used freely without harmful effect on the plant.

I am aware that various modifications of my invention may be made without departing from the spirit of the claims and I therefore do not limit myself to all of the ingredients or their proportions given above.

What I claim is:

1. An insecticide containing the bitter principle of bitter aloes and calcium arsenate.

2. An insecticide containing the bitter principle of bitter aloes, calcium arsenate, and permanganate of potassium.

3. An insecticide containing the bitter principle of bitter aloes, calcium arsenate, permanganate of potassium and magnesium sulphate.

Signed at New York, N. Y., this 24th day of July 1922.

ISIDOR B. ROSS.

Witnesses:
CHARLES A. MARSHALL,
FRANK SCHACK.